(12) United States Patent
Ryder (10) Patent No.: US 8,734,872 B2
(45) Date of Patent: May 27, 2014

(54) ACCESS CONTROL TO CONTENT PUBLISHED BY A HOST

(75) Inventor: Scott Ryder, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 587 days.

(21) Appl. No.: 12/242,902

(22) Filed: Sep. 30, 2008

(65) Prior Publication Data

US 2010/0083351 A1    Apr. 1, 2010

(51) Int. Cl.
*G06F 21/00* (2013.01)
*G06F 21/62* (2013.01)
*G06F 17/30* (2006.01)

(52) U.S. Cl.
CPC ...... *G06F 21/6218* (2013.01); *G06F 17/30902* (2013.01); *G06F 17/30893* (2013.01)
USPC ........................................................... 426/4

(58) Field of Classification Search
USPC .......................................... 709/200; 713/226
See application file for complete search history.

(56) References Cited

U.S. PATENT DOCUMENTS

| | | | |
|---|---|---|---|
| 5,787,247 A | 7/1998 | Norin et al. | |
| 7,088,855 B1 | 8/2006 | Vide | |
| 7,340,451 B2 | 3/2008 | Sacco | |
| 7,614,077 B2 | 11/2009 | Brew et al. | |
| 7,644,103 B2 | 1/2010 | Smith et al. | |
| 7,680,835 B2 | 3/2010 | MacLaurin et al. | |
| 7,796,779 B1 | 9/2010 | Strong et al. | |
| 7,844,918 B1 | 11/2010 | Ashe | |
| 2002/0054303 A1 | 5/2002 | Matsuyama | |
| 2003/0011683 A1 | 1/2003 | Yamasaki et al. | |
| 2003/0055972 A1* | 3/2003 | Fuller et al. | 709/226 |
| 2003/0059202 A1 | 3/2003 | Yoda | |
| 2004/0019801 A1* | 1/2004 | Lindholm et al. | 713/200 |
| 2004/0100486 A1 | 5/2004 | Flamini et al. | |
| 2004/0205504 A1 | 10/2004 | Phillips | |
| 2004/0264932 A1 | 12/2004 | Li et al. | |
| 2005/0190273 A1 | 9/2005 | Toyama et al. | |
| 2005/0206658 A1 | 9/2005 | Fagans | |
| 2005/0246352 A1 | 11/2005 | Moore et al. | |

(Continued)

FOREIGN PATENT DOCUMENTS

CN    1859086 A    11/2006
CN    1977490 A    6/2007

(Continued)

OTHER PUBLICATIONS

Chinese Application No. 200980138052.2—Notification of Second Office Action dated Aug. 6, 2013.

(Continued)

*Primary Examiner* — William Goodchild
(74) *Attorney, Agent, or Firm* — Womble Carlyle Sandridge & Rice, LLP (57) ABSTRACT

Methods and systems for providing easy access to information and sharing are provided. Embodiments of the present invention enable a host to grant access to published content to one or more users in a manner in which the user(s) can scan small portions of information to decide which information is desired. The embodiments described herein enable, for example, a user to see a library of content that is larger than the storage capacity of the computing unit used by the user. The sharing of information is also secured through the use of auto-lock keys and the creation of abstract identities for the host and each user.

20 Claims, 8 Drawing Sheets

(56) References Cited

U.S. PATENT DOCUMENTS

| | | | |
|---|---|---|---|
| 2005/0259945 A1 | 11/2005 | Splaver | |
| 2006/0085474 A1 | 4/2006 | Tsubono | |
| 2006/0122936 A1 | 6/2006 | Balfanz | |
| 2007/0005989 A1 | 1/2007 | Conrado et al. | |
| 2007/0050467 A1 | 3/2007 | Borrett et al. | |
| 2007/0195375 A1 | 8/2007 | Morimoto | |
| 2007/0223705 A1* | 9/2007 | Kasahara et al. | 380/281 |
| 2008/0270462 A1 | 10/2008 | Thomsen | |
| 2009/0030952 A1 | 1/2009 | Donahue et al. | |
| 2009/0046311 A1 | 2/2009 | Asai | |
| 2009/0132542 A1 | 5/2009 | Xu | |
| 2009/0177662 A1 | 7/2009 | Ryder | |
| 2010/0082680 A1 | 4/2010 | Ryder | |
| 2010/0293466 A1 | 11/2010 | O'Brien | |
| 2011/0167036 A1 | 7/2011 | Liebman | |

FOREIGN PATENT DOCUMENTS

| | | |
|---|---|---|
| CN | 101159556 A | 4/2008 |
| WO | 2004084050 A1 | 9/2004 |
| WO | 2008/008448 A2 | 1/2008 |
| WO | 2008/008448 A3 | 1/2008 |

OTHER PUBLICATIONS

Androutsellis-Theotokis, Stephanos; "A Survey of Peer-to-Peer File Sharing Technologies,"; *Eltrun, Athens University of Economics and Business*; 2002; 31 pages.

Berkvens, Winifried A.H. et al.; "Media Distribution in a Pervasive Computing Environment,"; *Proceedings of the Third IEEE International Conference, (PerCom 2005 Workshops,)* on Kauai Island, Hawaii, USA; Mar. 8, 2005; pp. 204-208.

Decandido, GraceAnne; "Metadata: Always More Thank You Think,"; htttp://replay.waybackmachine.org/20070609135125/httpp:/www.ala.org/pla/plapubs/technotes/metadata.cfm; 2007; 5 pages.

International Search Report mailed on Dec. 29, 2009, for PCT Patent Application No. PCT/US2009/055903, 3 pages.

International Search Report mailed on Feb. 10, 2010 for PCT Patent Application No. PCT/US2009/055907; 6 pages.

Menezes, A. et al.; "Key Management Techniques,"; Chapter 13 in *Handbook of Applied Cryptography*; Jan. 1996; pp. 543-590.

Muthitacharoen, Athicha et al.; "A Low-Bandwidth Network File System,"; *Proceedings of the ACM Symposium on Operating Systems Principles*; Oct. 21, 2002; pp. 174-187.

Sandhu, Ravi S. et al.; "Access Control: Principles and Practice,"; *IEEE Communications Magazine*; Sep. 1994; pp. 40-48; vol. 32; No. 9.

Final Office Action mailed on Apr. 16, 2012 for U.S. Appl. No. 12/242,899, 23 pages.

Final Office Action mailed on Jun. 9, 2011 for U.S. Appl. No. 12/242,899, 18 pages.

Final Office Action mailed on Sep. 19, 2011 for U.S. Appl. No. 12/242,903, 24 pages.

Non-Final Office Action mailed on Apr. 28, 2011 for U.S. Appl. No. 12/242,903, 24 pages.

Non-Final Office Action mailed on Dec. 9, 2010 for U.S. Appl. No. 12/242,899, 15 pages.

Non-Final Office Action mailed on Sep. 28, 2011 for U.S. Appl. No. 12/242,899, 21 pages.

Notice of Allowance mailed on Nov. 2, 2012 for U.S. Appl. No. 12/242,899, 11 pages.

\* cited by examiner

ACCESS CONTROL TO CONTENT PUBLISHED BY A HOST

BACKGROUND OF THE INVENTION

This is directed to methods and the use of systems to share information. In particular, the present invention is directed to providing users with easy access to information, and for enabling users with the capability to share information and services.

In this information age, a great number of individuals use multiple devices such as computers, personal digital assistants (PDAs), smart phones, etc. to prepare, review, revise, access and share information. For example, an individual may have multiple work computers, such as a desktop and a laptop, multiple home computers, a smart phone such as Apple's iPhone, and/or other devices. In addition, that same individual may socialize or work with various people. In some instances, people simply want to be able to share the digital photos, music, etc. with friends and family. In other instances, people want to share files with others who have to review and/or revise documents and files created by or edited by that individual.

There are many ways in which individuals try to deal with the issue of a single document or file existing on one or more computer-type devices. For example, the simplest solution may be to copy the file onto a portable storage device such as a flash drive, and only work on the version of the file on the flash drive. In this manner, the individual can use the file on virtually any computer at work, home, etc. This "solution" is not, however, without problems.

One potential problem may be related to performance, because flash drives are limited to the speed of the flash drive interface, which may be, for example, a USB interface. In addition, it may be difficult to back up the file without losing track of which version was backed up, and where the backup is located. In addition, it is usually impractical to attempt to circulate a document or file for review and comment in a business setting using a flash drive as this is much slower than modern computer networks. Such review would then be limited to occurring one person at a time, which would likely not fit within the time constraints of many projects.

Another common attempt to deal with this issue is to place the file on a server that can be accessed from multiple locations. This "solution" can be flexible, easy to set up and can operate without latency, as well as be integrated with the platform. On the other hand, however, such a "solution" can be difficult to use, where other users may have difficulty in locating the right file, as well as the issues of dealing with the potential of multiple identities, even for a single person. For example, an individual may have one identification based on the person's first name and a second identification based on a nickname. The normal system would treat those two as two separate users even though they are, in fact, the same individual. In addition, connectivity can be tricky, particularly when the individual may be using remote access (such as when the server may be located at work and the user is at home). One or more users may have difficulty accessing the file.

Instead of using a file server as a central location to store the file, different users simply e-mail the file back and forth. E-mail distribution is, in general, free (provided the users already have e-mail access). In addition, e-mail may be the easiest system to use because users simply have to have the knowledge necessary to attach a file to an e-mail. E-mail access is essentially universal, and the e-mails containing the file(s) can be forwarded. E-mail distribution of files, however, suffers from generally poor security. In addition, e-mail users are susceptible to SPAM and phishing (where someone tries to convince a user that their e-mail is from a legitimate source when it is not).

Distribution of files via e-mail also is likely to pose various additional problems. For example, in many instances the size of attachments is often limited by the internet service provider to a specific size, such as 10 MB. In addition, there can be problems in the file becoming "stale" related to the latencies between when a file is sent and when it is received, or looked at. These problems become even more acute when the overall size increases, such as in a situation where there are many users, lots of files, or very big files.

A more recent "solution" for these issues is the use of a website on the internet as a storage location. This type of solution addresses the problems of scalability related to the e-mail solution. In addition, there are usually no size or file-type limitations, and web sites for storing files typically provide better than average security to the users. The files can easily be forwarded to other users (or at least notice that a file is available), while providing a broad range of accessibility to those files.

A user utilizing the web for file distribution, however, is likely to be fraught with their own sets of problems and/or difficulties. The web is essentially a stand-alone system which is not integrated well with various platforms. In addition, the multiple identity problem seen when using the sever solution is also likely to occur with the web solution. The web solution can also be prohibitively expensive while providing inconsistent features and experience for the users. Finally, and potentially most significant, are the privacy and confidentiality concerns related to storing files on the web.

None of these "solutions" adequately addresses the problems related to sharing large volumes of multiple files. For example, a user who subscribes to Apple's "MobileMe" service is allocated a certain amount of storage space on a server on the internet. The user then has the ability to upload the files that user wants to share with others. Even though the uploading and management of that service space is relatively easy using Apple's Macintosh computers, the amount of space is limited and therefore requires an additional level of management. Moreover, there is no easy way for authorized individuals to know when changes to the files stored on the server have occurred.

One of the central problems that may be related to any of these "solutions" is security. Once files are being shared, regardless of the method of sharing, security becomes a greater issue. The issue is not simply locking down the files so that they are only accessed by select individuals. The issue is broader in that the security should not become an impediment to accomplishing the task that the shared files are merely a piece of. In this manner, the security system needs to be easy to use, if not transparent, for authorized users. The security system should be flexible and be able to work with existing systems and be able to use (but not limited to) common conventions, such as name and password or personal identity certificates (as outlined in the X509 specification), and the use of access control lists (ACLs).

An additional issue that occurs when dealing with the multi-user environment is related to higher level data and information than is typically shared and/or revised by the users. For example, none of the solutions discussed above can be used to view and manipulate information such as metadata and/or application settings that might be needed to accompany the files being shared. Thus, context is lost and in many instances, the context can be critical. Without the proper settings, different users may view a file in a completely different light.

The present invention solves these problems and others, and is related to commonly-assigned co-pending U.S. patent application Ser. No. 12/242,899, filed concurrently herewith, and commonly-assigned co-pending U.S. patent application Ser. No. 12/242,903, filed concurrently herewith, each of which is hereby incorporated by reference herein in its entirety.

SUMMARY OF THE INVENTION

Methods and apparatus for giving multiple users access to files and general purpose information (sometimes referred to as metadata) are provided. In accordance with one embodiment, the present invention can enable a group of users to easily and transparently share data files. This data can include massive collections of things, such as photo libraries, song libraries, movies libraries, device schematics, budget estimates, project files, etc., or the data could be as simple as a single file. For example, three individuals who have common friends and have traveled together may want to be able to view and share the photos each of them took on their travels. These photos may include individual files that exceed the typical size limitations of common e-mail environments. In addition, the size of the libraries each individual has may include thousands of photos that occupy many gigabytes of space.

In some embodiments, the present invention establishes ways to track individual items by creating "cards" for each item in a general catalog. Each item can have multiple representations each expressed though a single unique card within a single catalog, so that it can be easily accessed. For example, a single photo may be represented multiple cards as "Skiing Trip," "Trip with the Gang," "Skiing in Colorado," "Winter Vacation," "Bill," "Fred," "Steve," etc. This enables the systems to have a virtually unlimited number of hierarchical organizational structures within catalogs. Additionally, each unique card representing the same single photo can be placed in a different catalog. Thus for a "single" photo it can also be organized in a virtually unlimited number of catalogs.

In some embodiments, the methods and apparatus of the present invention provide representations of secondary information that is associated with, or derived from, the primary information. For example, some of the representations (associated with a single card) may each be linked with thumbnail or lower-resolution images of the master images. In other instances, a movie file represented by a card my have different edits, the script, bills for camera rental, etc., all associated with that single card. One embodiment of the invention allows both multiple cards to represent a single "file" and at the same time multiple files to be organized as representations of a single card.

In some embodiments of the present invention, the card catalog is significantly smaller in size that the information it represents. In addition, it may be advantageous, in accordance with some embodiments of the present invention, to move the catalog and store it locally to enable high speed inquires even though the data it references is not stored locally. For example, when dealing with a photo library, such as a 50 GB, 14,000 image library created with Apple's iPhoto product, the card catalog could be on the order of 2-10 MB, depending on the number of different representations for each of the images. The significantly smaller size of the catalog makes inquires from the user appear to be answered almost instantaneously because they are processed locally never going over a network to a "server." In addition, there may be multiple levels to a catalog to provide even faster response time depending on the needs of the user. If the user selects "search by subject—no source," an even smaller sub-catalog may be used by the system so that the response is virtually instantaneous. On the other hand, the user could select "search by subject—from 'Fred'" which might in one embodiment of the invention search across the entire catalog ultimately presenting the user with a refined set of thumbnails to review.

In accordance with some embodiments of the present invention, a user can be given access to all of that user's libraries (or catalogs), regarding of the computing or mobile device the user has in his or her possession. For example, assuming a user has an iPhoto library, an iTunes library and a project library for a new building that user is part of a team of people working on (the project library might include a series of digital blueprints, a 3D model of the building, video clips of animations of walking around the building, a contact list of all the people on the project, etc.).

The user utilizes a desktop computer at home, a laptop computer for traveling, an iPhone, an Apple TV and a desktop computer at work. The user, however, can be provided with access to all of those libraries regardless of which device is being used. Moreover, that access should be provided to the user in such a manner that the exact location of the information is essentially irrelevant. That is, the user experience should be such that the responsiveness of system could lead the user to believe that all of the files and information being sought are stored locally on whichever device the user has. If the user puts down the laptop and picks up the iPhone to continue the task, system performance and user experience for the activity should be essentially seamless.

In some embodiments of the present invention, the user is provided with systems and methods for accessing various levels of information that can be scalable like a server-based system, easily accessible like through an e-mail-based system, while also being accessible virtually anywhere like the web-based systems. In this manner, the systems and methods of the present invention provide the greatest benefits of each of the previously known systems while overcoming many, if not all, of the deficiencies.

In some embodiments of the present invention, the systems and methods are configured to provide a security system that can work within the framework of existing systems, while providing additional security needed for a distributed architecture. For example, conventional name/password type security and/or certificates could be employed, while also enabling access control lists (ACLs). The ACLs can be used to help establish user and group permissions, which can be set and/or updated at various levels, including at the user level locally, remotely or via online services. It may even be desirable to provide recipients with the ability to set their identity (and to provide the ability to limit this feature via parental controls). It may also be advantageous, in accordance with some embodiments, to provide the ability to consolidate (or link) identities to enhance ease of use for the user.

In some embodiments of the present invention, the user application can define the level of sharing between the user and others. The location of the sharing can also be set by the application such that the sharing can originate from the local computer, from a specific machine or remotely via an on-line service. The system can be used to define the parameters for the ACLs, and then the application can be responsible for applying those parameters. It can also be advantageous to optimize the security features for common occurrences. For example, specific sets of users can be "burned" in as a default so that the users do not have to "recreate the wheel" every time a user from the group tries to access the information for the first time. Then the default settings can be established so that a large majority of the cases are covered without the user having to reconfigure the system. In one embodiment of the invention configuring a system is a simple task of changing a select number of clearly understood defaults. This is as opposed to traditional systems where configuration can require going through "screens and screens" of arcane configuration options and settings.

In accordance with methods and apparatus of some embodiments of the present invention, the system and/or application can auto-generate abstract identities of authorized users such that the publisher does not need to be aware if a user changes their identity. Thus, users can, and likely will, end up with multiple identities, some of which will be publicly known and others will be known only internally to the system. In order to accomplish such an architecture, however, there should be a trusted channel of communications so that there is a "man in the middle" to handle the linking of identities. For example, while a user might have a public identity of harvey@mac.com, the system might have created an additional identity of b75486+hank@harvey.members.mac.com. In this case, the "b75486 identity" could, in accordance with some of the inventions described here, be a system-generated encryption key for added security, but it is not required.

Persons of ordinary skill in the art will appreciate that at least some of the various embodiments described herein can be combined together, or they can be combined with other embodiments without departing from the spirit of the present invention.

BRIEF DESCRIPTION OF THE DRAWINGS

The above and other features of the invention, its nature and various advantages will be more apparent upon consideration of the following detailed description, taken in conjunction with the accompanying drawings in which.

DETAILED DESCRIPTION

Figure 1:
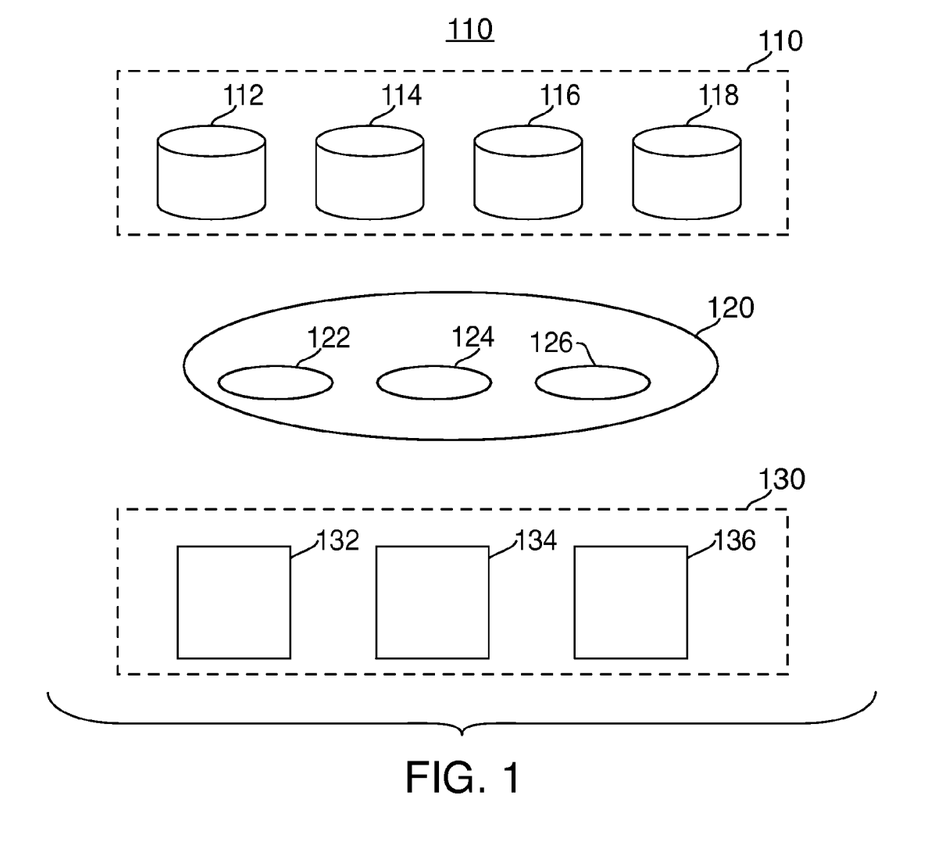
FIG. 1 is a simplified block diagram of a network system in accordance with one embodiment of the invention.

FIG. 1 shows a simplified diagram of network system 100, which can be operated in accordance with some of the principles of the present invention. Network 100 includes catalogs 110, interface framework 120 and storage 130. Catalogs 110 include a series of catalog units which, for convenience, have been labeled sequentially, catalog units 112, 114, 116 and 118. Persons of ordinary skill in the art will appreciate that catalogs 110 can include any number of catalog units, as will become more apparent from the discussion below. It should be noted that catalog units 112, 114, 116 and 118 (as well as other catalog units within catalog 110) can be, for example, servers that store catalog card information and/or notification servers that handle communications between authorized users of assets, changes to assets, etc., as is described in more detail below.

Interface framework 120 is a representation of the network components, which may be hardware, software or a combination thereof, which operate to control various aspects of network 100. These components can include catalog manager 122, asset manager 124 and security manager 126, an overall framework level application program interface (API) would be used to interconnect operations between the managers and other parts of network system 100 and any client applications that use framework 120. For example, catalog manager 122 keeps track of and helps users manage the catalogs resident on catalogs 110. Asset manager 124 similarly keeps track of and helps user manage the assets resident on storage 130. Security manager 126 manages various security issues, such as creating unique system IDs for each user, applying sharing preferences as requested by the users, creating and managing security keys that are associated with the appropriate data elements as they are stored and retrieved on the system, etc. The functionality of each of these managers is discussed in more detail below.

Storage 130 includes a number of separate, unrelated data storage units (which may, themselves, include a number of interconnected storage units). For example storage 130 can include storage units 132, 134 and 136. Each of storage units 132, 134 and 136 can be, for example, a high-capacity server that can be used by network system 100 to store assets of the users using system 100. The storage units, however, can also be distributed so that some are network devices and some are not (for example, storage units 132 and 134 can be network devices and unit 136 can be a local device). Stored assets can include, for instance, the actual digital photos in a users photo library, and/or the actual digital versions of all of the music in a users iTunes library, or different representations of that data as derived by client software from the originals.

Figure 2:
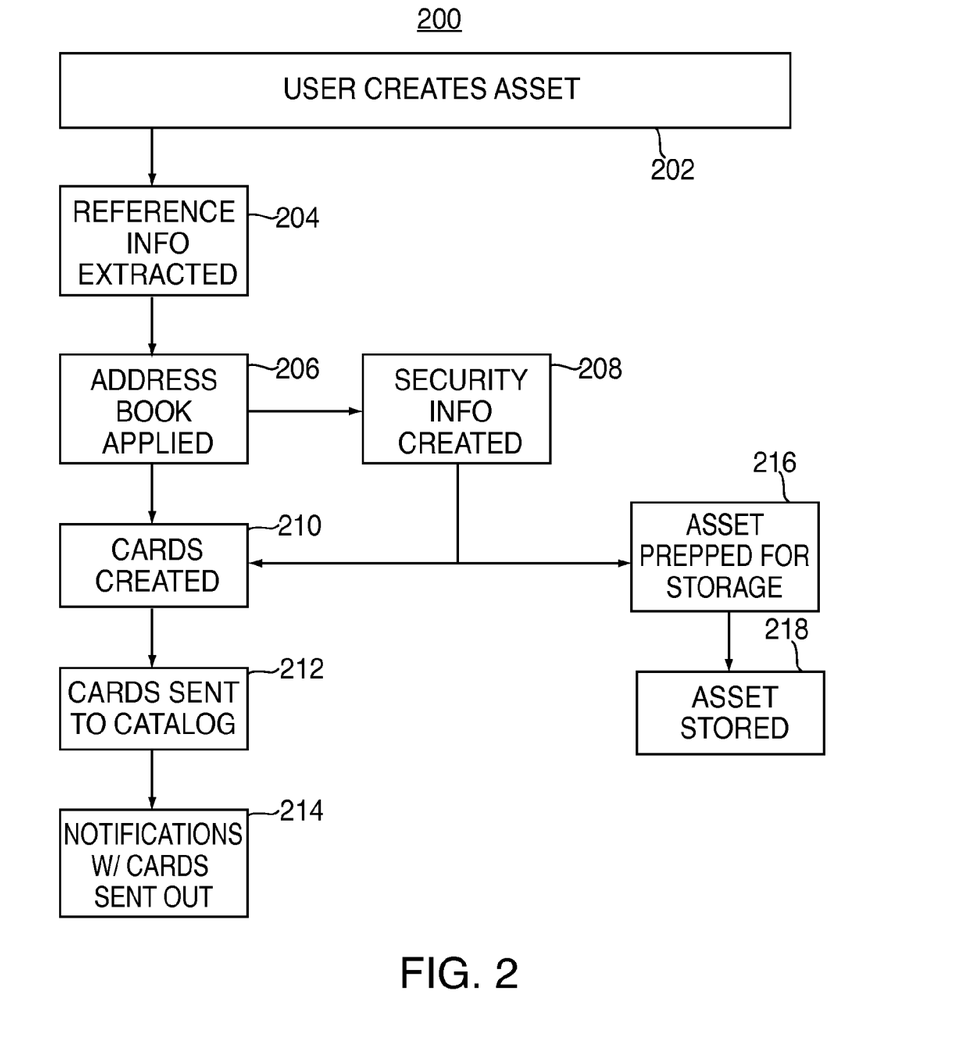
FIG. 2 is an illustrative flowchart of a general view of a process for operating the network system to add assets in accordance with embodiments of the present invention.

A general representation of how system network 100 may be used to store assets in accordance with some embodiments of the present invention is shown in FIG. 2 (additional details are provided below with regard to other figures). System flow 200 can be initiated when a user creates an asset in step 202. That asset could be created locally, for example, on an iPhone by taking a photo with the built in camera. That asset will eventually be stored in one or more of storage units 132, 134 and 136 (or any other storage unit in storage 130).

For that asset, multiple pieces of reference information are extracted and/or created in step 204 (one piece of reference information that might be created could be a nonvolatile "digital fingerprint" for the asset). For example, for a given digital photograph asset, the reference information may include one or more thumbnails of the photo (which, in accordance with at least one embodiment of the present invention, might be stored as either separate assets or separate representations of a single asset as expressed through a single "card" in a catalog), such as at different resolutions, one or more keywords, the GPS coordinates where the photo was taken, the name of the event that the photo is associated with. More or less information may be included in any given reference information, except that the reference information should not include the digital asset itself, so that the size of the card (or cards) representing the asset are substantially smaller than the size of the asset—for example, a video asset may be on the order of 4 GB while the reference information for that asset could be on the order of 1,000 bytes. The extraction/creation of reference and/or meta information could typically be carried out within framework interface 120 or in the client application itself. In particular, catalog manager 122 could perform the extraction/creation process. This portion of the framework could be resident on the local computer, or it could be located elsewhere on network 100.

Interface framework 120, can do several things as well. Framework 120, through catalog manager 122, can interface with an address book in step 206 to determine where the reference information should be propagated to (the addresses, as is described in more detail below, can be utilized as a foundation for security, as well as being used as a hint as to where storage should occur), and it applies that address information accordingly. Once the address book information has been applied, a security operation can occur in step 208. Security operation 208 applies a set of given access rules and creates a set of access keys in accordance with some embodiments of the present invention, the details of which are set forth below. The security operation could be carried out entirely by security manager 126 locally or could be assisted by security components on network 100. One or more virtual cards are created in step 210 by combining the reference information from step 204 with the address book and security information of steps 206 and 208. For example, the user may have selected individuals and/or groups of individuals to have access to the assets. Catalog manager 122 can carry out the creation of the cards with the resulting cards then being placed in catalogs 112, 114, 116 or 118. This step could also be assisted by other catalog manager components running on network 100.

Catalog manager 122, in step 212, sends the cards to one or more of catalogs 112, 114, 116 and 118, where the cards are stored. Notification of the existence of the new cards (or of modified cards) is sent out in step 214, which can also be executed by catalog manager 122 or by other catalog managers running on network 100. In at least one embodiment of the invention this notification can be very simple (such as a "direct" communication among the catalog managers running on network 100) or more robust using one or more e-mail messages that can have varying levels of autonomy. This process can also be optimized so that there can be fewer copies of the updates sent which can further enable rapid updates (this may also entail existing user updates as well). For example, at the highest level, notification step 214 could simply identify assets that e-mail recipient can access. Alternately, notification step 214 could provide an invitation that, if accepted, would cause the relevant cards to be directly accessible by that recipient on his or her local computer (as described in more detail below). Another alternative might be that the recipient previously set a preference to accept all cards from the sending user, in which case card manager 122 could automatically provide direct access to the new/modified cards without any interaction with the recipient (it still may be desirable to send the recipient an e-mail notifying them that access to new cards has been added to the local machine).

Security manager 126 also performs an additional function in step 208, in that security information is also created for the asset itself (such as the creation of access and/or encryption keys, etc.). The security information is then handled by the asset manager 124 in step 216, which prepares it for storage by combining it with the security information obtained in step 208 (in one embodiment of the invention this might take the form of encrypting the asset with the provided encryption key). Asset manager 124 stores the assets, in step 218, on one or more of the storage units 132, 134 and 136 within storage 130. Once steps 214 and 218 have been completed, the new assets stored on network system 100 are accessible by the authorized users.

Figure 3:
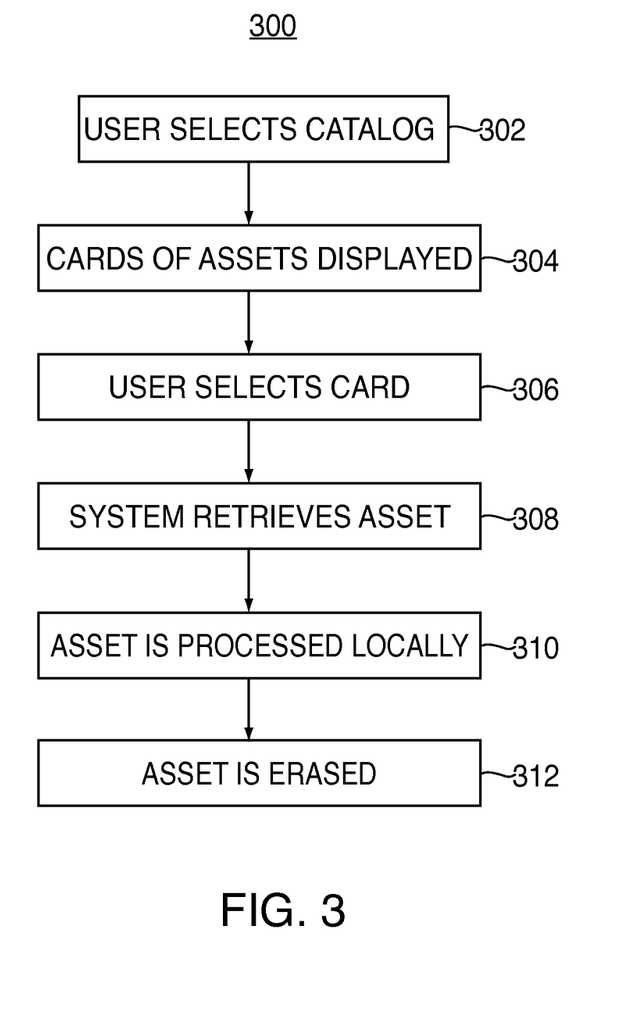
FIG. 3 is an illustrative flowchart of a general view of a process for operating the network system to view assets in accordance with embodiments of the present invention.

FIG. 3 shows an illustrative flow chart of a general view of a process 300 for obtaining assets that have been stored on network storage. A user, in step 302, selects a catalog from another user (assuming that all or most of the catalogs for the user are stored locally; however, if they are not stored locally, the catalog is fetched). Selecting the catalog may be, for example, simply selecting a library of another user within Apple's iPhoto application. The library could include any number of photos. Under "normal" circumstances, where the user was selecting one of his or her libraries, all of the photos are typically stored locally on a hard drive of the computer (in most instances, this will be the case, where the user's own assets are at least stored locally).

In accordance with embodiments of the present invention, the user can select a library of another user in the same manner as selecting a locally stored library. This selection can be as simple as selecting the other user from a list, which causes a list of that user's libraries to be displayed so that one of those libraries can be selected. When the user selects a library of another user, network system 100 operates such that the information and assets of the selected library are displayed at a higher level for the user with little, if any, delay. The user can also be provided with the ability to choose and organization method to be used. This organization can be different than the owner of the library would have used. Organizational changes made by each of the users do not necessarily need to be reflected to all users of a library (aka Catalog).

In this instance, because another user's library was selected, network system 100 provides, in step 304, the complete catalog that contains the library including all the cards related to the library to the user. Catalog manager 122 retrieves the catalog and cards from one of catalogs 112, 114, 116 and 118 and provides them to the user's computer via network system 100. Because the size of the catalog is relatively small, the cards can be transmitted to the user and displayed on the user's computer or handheld mobile computing device with little to no latency (e.g., within the normal access wait times users find acceptable). For example, under normal circumstances in one embodiment of the invention, if a user selects a photo library, a series of photos from the library would be displayed and those photos, or thumbnails of those photos, would be retrieved from storage 132, 134 or 136 if not present locally. In accordance with embodiments of the present invention, the display of photos or thumbnails of photos of another user's library would be transmitted to and displayed on the user's computing device in roughly the same amount of time as would have occurred if one of the user's own libraries had been selected instead (so that the user is basically unaware of where the photos, in this instance, come from).

The user then selects one of the photos from another user's library in step 306. Once again, if the user had selected a photo from his library, the computing system would simply retrieve the asset (i.e., the actual photograph in this case) locally and display it (alternatively it may, for example, simply be stored in local cache memory). In response to the selection of the other user's photo, network system 100, in step 308, operates to retrieve the photo from wherever it is stored. To effectuate that retrieval, asset manager 124 operates to retrieve the selected photo from one of storage units 132, 134 and 136 (the system can be configured, in accordance with another aspect of the invention, to automatically select the particular asset or assets that are appropriate for the device being used and the context that the asset is to be used—in this instance, for example, by only retrieving the resolutions of the photo that can be fully displayed on the requesting device). The retrieved photo can first be stored in a local cache managed by asset manager 124 so the subsequent requests for the photo can be satisfied from the cache, and returns it to the user's application via framework 120.

Once the photo was retrieved, the computing device displays it, in step 310 (this step may also require decrypting the retrieved asset). The process of retrieval and display should be relatively transparent to the user, so that the user's experience is similar to what might occur if the user had selected a locally stored photo. Once the user has completed using the asset, the asset may be erased from that user's local computing device's cache in step 312 (the erasure step could, for example, be an option provided to the user). This may occur, for example, if the user closes the individual picture or if the user exits the application in which the asset was being used.

There are various ways, however, in which network system 100 can operate once the asset has been delivered to the user's computing device and has been altered by that user. One of those instances is illustrated in FIG. 4, which shows how, in accordance with embodiments of the present invention, network system 100 addresses changes made to an asset by a non-owner of that asset (assuming the original user gave permission to the current user to modify the asset.

Figure 4:
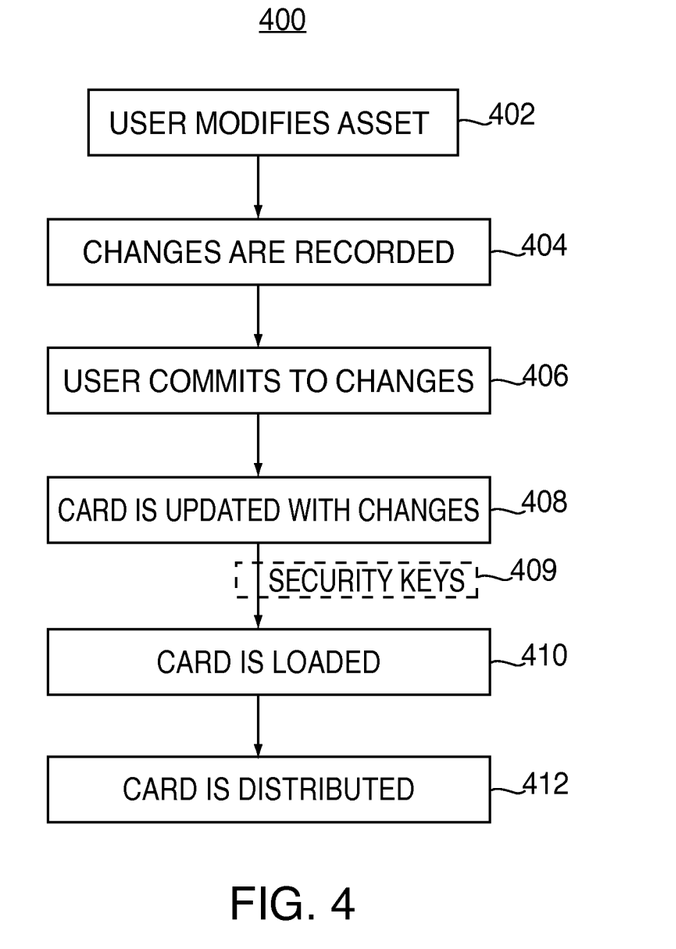
FIG. 4 is an illustrative flowchart of a general view of a process for processing changes to an asset in accordance with embodiments of the present invention.

As shown in FIG. 4, a user modifies an asset that is not owned by that user in step 402—for convenience, the asset will continue to be referred to as a photo, but can be any asset, such as a song, a ringtone, a digital video, a spreadsheet file, etc. Rather than actually modify the asset itself, network system 100 acts to record the changes that are to be applied to the asset, in step 404, using framework 120 and the local computing device (and those modifications can be stored as metadata). Even though the changes are being recorded separately from the asset, the user cannot tell the difference because the displayed image, in this case, shows all of the changes that have been made. For example, if the user accesses another user's photo and crops the photo, the system records the dimensions and location of the crop and applies the crop locally so that the user instantly sees the change that was made, but the asset itself is not altered in any way (the dimensions and location of the crop could be stored as metadata that is associated with that individual user's view of another user's photo). In another mode of operation the invention could actually modify the asset data itself in response to user requests. These modifications could be stored as alternative versions of the asset, yet still be associated with the same "card" as the original.

The user may continue to make additional changes "to the asset" which will be similarly recorded and displayed (such as adjusting the white balance of the photo). Once the user has completed working on the file, the user indicates that he is committed to the changes in step 406. This can occur by many different mechanisms such as the user simply closing the photo itself (by clicking on the CLOSE box instead of quitting the application and possibly responding to a dialog box that could ask, for example, "Do you want to save changes?"), or by quitting the application. After the user has committed to the changes, framework 120 updates the card, in step 408, that contains, in addition to other information, all of the changes that were made to the asset (or as outlined above uploads the modified data to one of the stores 134, 136 or 138 and associates it as a new version of the original asset. Yet, still associated with the card.). The card can also include, for example, an identification of the user who made the changes, the time and date the changes were made, the application used to make the changes (e.g., Apple's iPhoto and Aperture programs can both be used to modify digital photos), etc. The system can decide whether to update the digital file or to create a "new" version of the asset itself instead of storing just the metadata recording of the changes.

Once the card has been created, an optional step 409 may occur related to security (step 409 is shown in FIG. 4 as a dashed box to further indicate that it is an optional step based on the security settings as applied to a given user or group of users). If additional security measures are required (such as, for example, that the modifying user requires an additional level of limited access to the modified asset or encryption), security manager 126 can be called upon to create additional security keys to append to the card prior to the card being uploaded to one of catalogs 112, 114, 116 and 118 in step 410. After the card has been placed in a catalog, network system 100 creates and sends, in step 412, one or more messages to the original owner of the asset and any other authorized users to let them know that the asset has been changed. The updated card can relate, for example, a thumbnail of the revised photo (if a "new" digital asset was created) and/or it can contain the actual instructions (i.e., metadata) for the revisions.

The decision of which information is to be included in the card can be user selectable in various forms, or it can be determined by the system. For example, the user could be provided with a series of boxes to select which types of information to include, as well as the size of each unit. This could aide the user in fine-tuning the system's operation to an acceptable level of performance. Alternately, the user could simply be given something like a graphic slide bar in which the scale could, for example, be the amount of information stored locally versus access time. Another option for the system may be to make all such decisions internally based on estimated performance characteristics. For example, if the size of the thumbnail is significantly larger than the size of the photo editing instructions, it may be more efficient and provide the user with improved performance to actually send the changes.

Embodiments of the present invention can be applied to various different environments. For example, the description above related specifically to digital photos and collections of photos (e.g., organized into events). The embodiments of the present invention can be applied to any collections of assets, such as an iTunes music library, a digital video project or series of projects, and/or an integrated project that can utilize assets from multiple different applications, such as Apple's Keynote presentation application (in which video clips, digital photos, graphics and text can be integrated).

When utilized for an integrated project, embodiments of the present invention can enable various different individuals to update and maintain different pieces (i.e., assets) of the overall presentation. As those pieces are updated, they are virtually instantly updated in the project for all authorized users. For example, if a user updates a video clip using Apple's iMovie or FinalCut applications, and that movie is located on one of the Keynote presentation slides, embodiments of the present invention will create a card as described above containing the changes to the video clip. The card will be transmitted to all authorized users who will be able to view the updated video clip almost as soon as the revisions have been made as they apply the metadata encapsulating the changes that were made. The authorized users can, in the event that the application of metadata changes fails, be provided with the modified version of the asset itself (which will, invariably, be a slower process).

Moreover, while the present discussion has been focused on actual assets, such as digital photos, digital movies and digital music, the embodiments of the present invention can also be utilized to effect common changes across applications for information other than assets themselves. For example, if multiple users are working on editing a large photo shoot in which different photographers took thousands of pictures, embodiments of the present invention can be utilized to control and modify some of the metadata associated with all of the pictures and/or the project itself.

In conventional systems, while a single user could select all of the photos in a project or library and try to apply a metadata change to everything selected, this technique is prone to errors. For example, if a user might believe that all of the photos have been loaded and therefore, applies one or more global metadata changes to all of the photos in the library. There is a strong likelihood that extra photos added to the project will be missing those global changes. In addition, this technique simply does not work in the instance where multiple people are adding photos to a single library or project.

Figure 5:
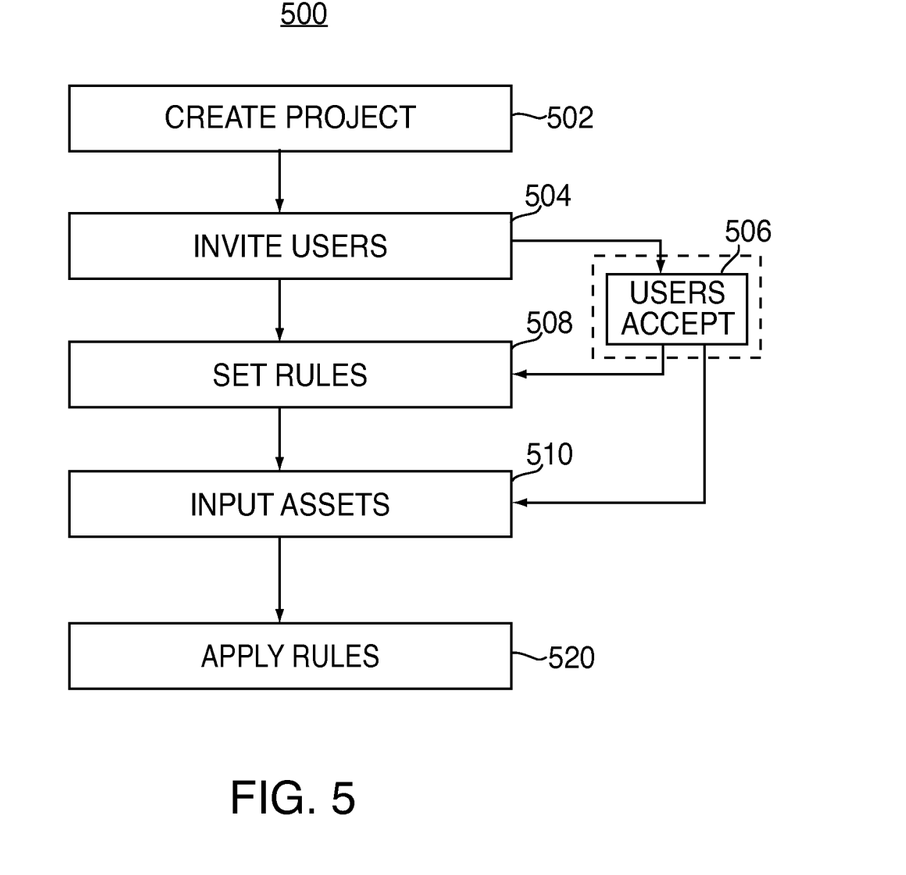
FIG. 5 is an illustrative flowchart of a general view of a process for creating and applying rules to a project having multiple users in accordance with embodiments of the present invention.

In accordance with some embodiments of the present invention, project level metadata and/or rules can be shared and applied across multiple users. FIG. 5 shows a diagram of system process 500, which illustrates how a project may be created and used by multiple users, where global rules can be set and applied across multiple computing devices. Process 500 begins when a host (who could also be one of the users) creates a project in step 502. This step could occur, for example, using Apple's Aperture photo management application to set up a project called "Annie Jr.," where a staff of five photographers shoot photos for a children's theater. Under normal circumstances, each of the photographers would provide their photos to a single person for editing and processing. This would result in a potentially long period of time before the cast and their families would get to view and purchase photos from the show.

In accordance with some embodiments of the present invention, the host creates a group list that, as described above, causes access and a link to the catalog containing one or more cards to be sent to each of the users on the group list. The notification, in step 504, can notify the users that the asset(s) have been created and/or notify the users that they are authorized to add and modify information in the project. The host can have the option of requiring an affirmative acceptance, in step 506.

The host and the users can set rules in step 508 that relate to the entire project. The rules can be individual rules that may be applied to every asset added to the project (such as the name of the project, or this instance the name and date of the show). Alternatively, the rules can be high level rules that apply to the project, such as a rule that automatically adds the name of each submitter to the metadata appended to each asset. As described above with respect to FIGS. 2-4, each of the rules can result in a change that is distributed to all authorized users, or network system 100 can create a single card that relates to any and all project rules (or some combination thereof). Interface framework 120 can then modify the behavior of the relevant application appropriately when the user is working in the given project.

Each of the authorized users can begin utilizing the project almost immediately after the host sets up the group list. For example, each of the photographers can go straight from the photo shoot at Annie Jr. to their home or studio and download the photos from their cameras into the project as assets in step 510. This will cause those assets to be represented by cards and associated with the project, which will also propagate the proper information to the catalogs, etc. The application, having already received a rule to append the user name to each asset published by that user, will automatically, in step 520, apply that rule and add additional metadata to each card previously added to the project to include the user name of the user who adds the photo to the project. Once the photos are loaded into the project, each of the authorized users can modify any photo, regardless of whether they published the photo, as shown in FIG. 4 and described above.

Some of the advantages of these embodiments of the present invention include the fact that each of the users can work on the entire project regardless of how small or large a percentage of the assets that user added to the project. In addition, these techniques can be utilized so that everything in the project behaves in the same manner, regardless of the "capacity" of the computing device the application is running on. In this manner, network system 100 enables the application to rely on the system to accomplish certain tasks pertaining to (but not limited to) distribution of data, coordination of data, metadata, derivative data, alternate representations, organization of large quantities of data, and changes to both instead of having to rely on each of the individual users, thereby providing greater consistency and dependability.

An additional advantage that may be obtained from these embodiments of the present invention is the high speed transfer and responsiveness to multiple user interactions resulting from newly realized efficiencies that are possible when the two techniques—asset management and metadata management—are established as separate and independent channels. Network system 100 can be globally asynchronous, while the metadata information access can be locally synchronous.

Other advantages of some of the embodiments of the present invention relate to the fact that users can "feel" like they have much more information at their fingertips on their computing devices than they actually have. Importantly, network system 100 can provide any of the information they do not have locally in a relatively speedy manner so that the user does not necessarily realize the sought after information is being downloaded from another location.

One example of the power of the embodiments of the present invention can be seen when looking at one of Apple's current product, the 8 GB iPhone. Using the techniques described herein, a user could have the ability to look through 30 or 40 GB of photos on that 8 GB computing device, because most of the reviewing would be accomplished using cards and thumbnails tailored to the device instead of the actual full resolution assets. For example, a sample photo library on iPhoto having roughly 14,000 photos would have roughly 45,000 associated files and could take up more than 42 GB of space. Under normal circumstance, without the advantages of some of the embodiments of the present invention, it would be impossible to view that library on an iPhone. When that iPhone is part of network system 100, however, that same iPhoto library can be viewed on the iPhone through the use of a card catalog that takes up less than 4 MB of space. Thus, not only could the user of the 8 GB iPhone view more than 42 GB of photos, the user could also have access to virtually as much digital music as he had on his iTunes library on a desktop or laptop computing device (and have access to a large quantity of video files as well).

Figure 6:
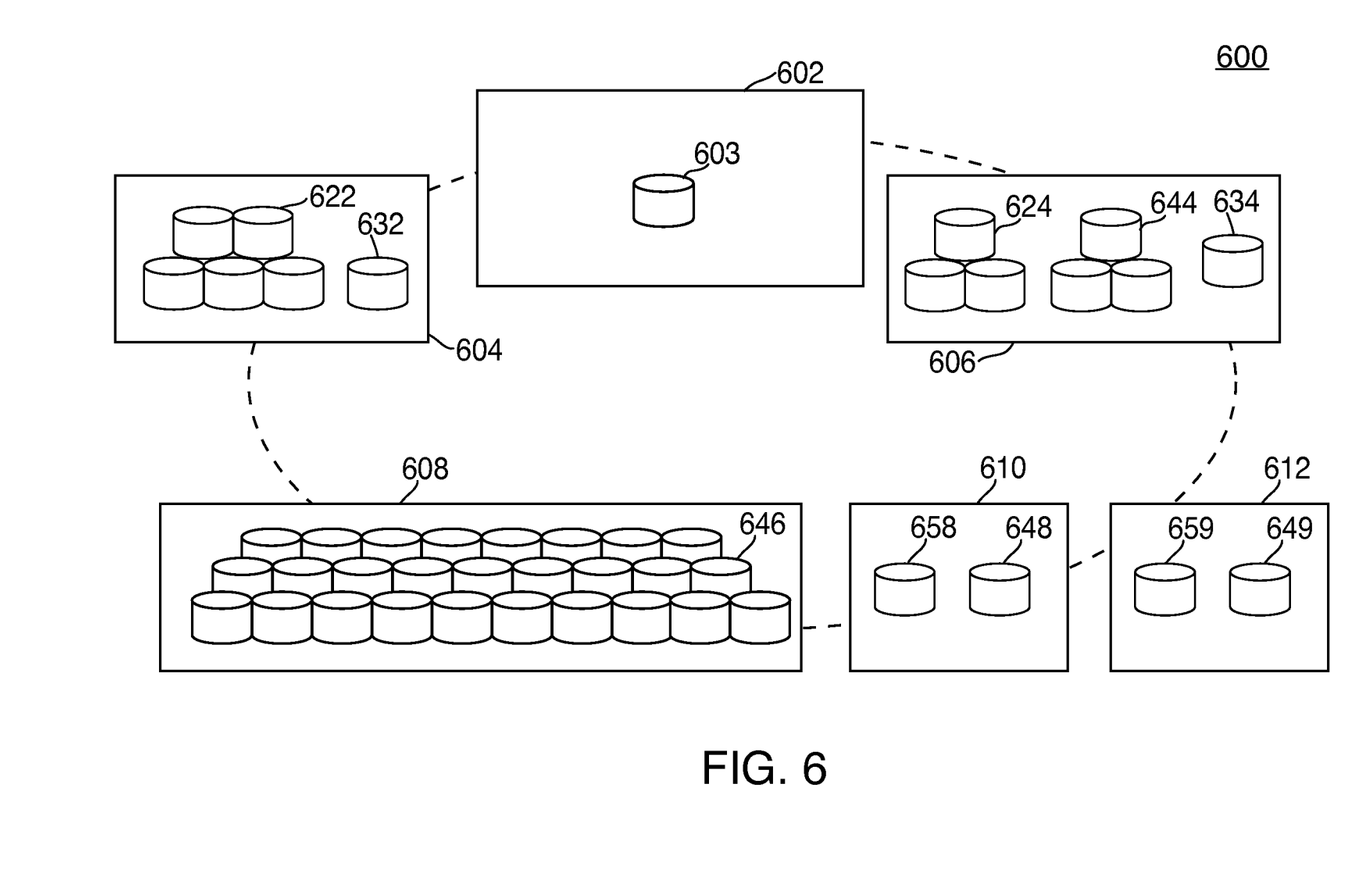
FIG. 6 is schematic diagram of a sample system configuration of a network system in accordance with some of the embodiments of the present invention.

FIG. 6 shows a sample system architecture 600 for network system 100 which can be operated in accordance with some embodiments of the present invention. System architecture 600 includes librarian services 602, business offices 604 and 606, offsite storage 608 and small user sites 610 and 612. This illustration is given to shown, among other things, the scalability of some aspects of the techniques of the present invention.

Librarian services 602, which includes server 603, could provide network system 100 with a centralized root and arbitrator that has location, routing, security, and management information. Business office 604 is representative of an information technology center in a given city for a company, and includes catalog servers 622 (which hold and manage the catalogs for that business center's users) and notification server 632 (which delivers reliable notifications to authorized users). As shown in FIG. 6, business office 604 does not store any assets locally.

Business office 606, on the other hand, includes catalog servers 624, notification server 634 and on-site storage servers 644 (which hold all of the assets referenced by a catalog). Architecture 600 can utilize off-site storage 608, which includes storage servers 646, in different ways. Business office 604 can store all of its assets in storage servers 646, while business office 606 might utilize off-site storage 608 to handle overflow conditions and to store backup images off site for safety. Business offices 604 and 606 can be different offices or a single company that are configured differently, or they can simply represent two different companies entirely.

In addition to business offices 604 and 606, architecture 600 includes small business offices 610 and 612, which are configured in another manner. In particular, small businesses 610 and 612 each include a single server, 658 and 659, respectively, that handles the catalog and notification functions. Each small business also includes an on-site storage server, 648 and 649, respectively, to store all of the assets of the respective business.

All of these components are coupled together via interface framework 120, which is represented as dashed line 660 in FIG. 6. Interface framework 120, optionally working with librarian service 602, can advantageously rely on direct notifications and/or e-mails for the distribution of the cards for the catalogs.

One issue referred to above that is important to some of the embodiments of the present invention is security, as carried out by security manager 126. For efficient operation, security manager 126 could provide the user a level of security that works with existing authentication systems (such as user name and password systems). Security manager 126 could also provide the user with an easy way to manage access control lists (ACLs), which would then govern the relationship between users, cards, rules and assets. In this manner, any given "owner" of an asset can easily control which users and/or groups of users can view the assets and which can modify them.

Figure 7:
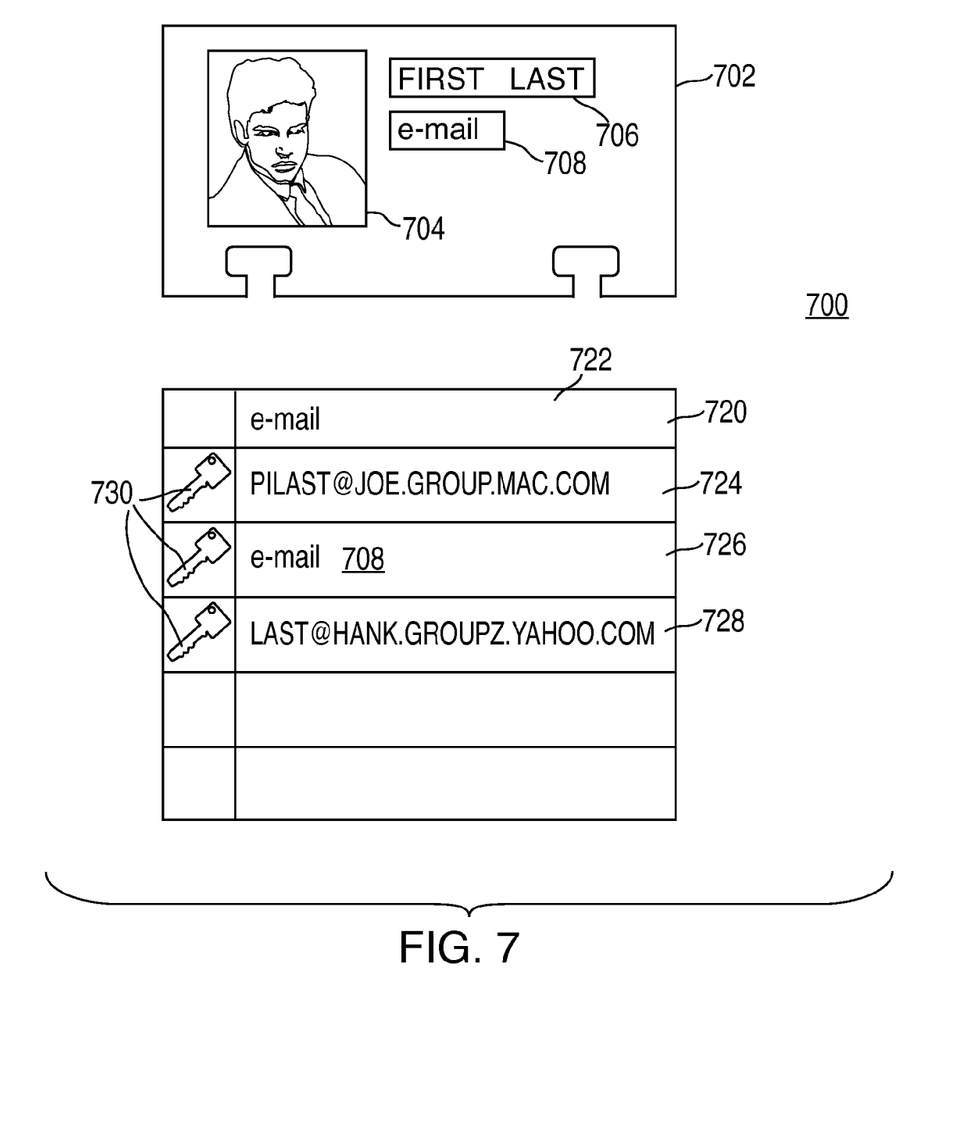
FIG. 7 is an illustration of creating abstract identities in accordance with some embodiments of the present invention.

One way in which the security can be accomplished is shown in security configuration 700 in FIG. 7. Configuration 700 includes address card 702 and identity representations 720. Address card 702 can be a common address card that can include a photograph for identification 704, name information 706, e-mail information 708 and any other information used to identify individuals or groups. The information on address card 702 is the information used by "the general public" to identify an individual.

Identity representations block, which can be maintained by security manager 126, 720 includes one or more identifications that network system 100 can automatically generate behind the scenes (so that the user does not need to be aware of the multiple ways in which she is identified). These identifications can include top-level e-mail identifier 722 as an "anchor" that other users can easily use to set ACLs for a given entity and a series of system-generated IDs, such as Group 1 ID 724, e-mail ID 726 (the system, in most instances, would use e-mail 720 or 726, but not both) and Group 2 ID 728. Network system 100 generates, on an as-needed basis, IDs to which it appends a security key 730 (shown generically as key when, in reality, each key is unique).

In the example shown in FIG. 7, system-generated ID 724 includes the first initial and last name of the user (without any space between them) followed by the identifier of the group. There will, in all likelihood, be additional users within this group that will have different first initial and possible different last name, but the same extension (shown in FIG. 7. as JOE.GROUP1.MAC.COM). Identifier 726, on the other hand, simply includes the user's e-mail address appended with a security key. Identifier 728 is similar to identifier 724, but for a different group.

Figure 8:
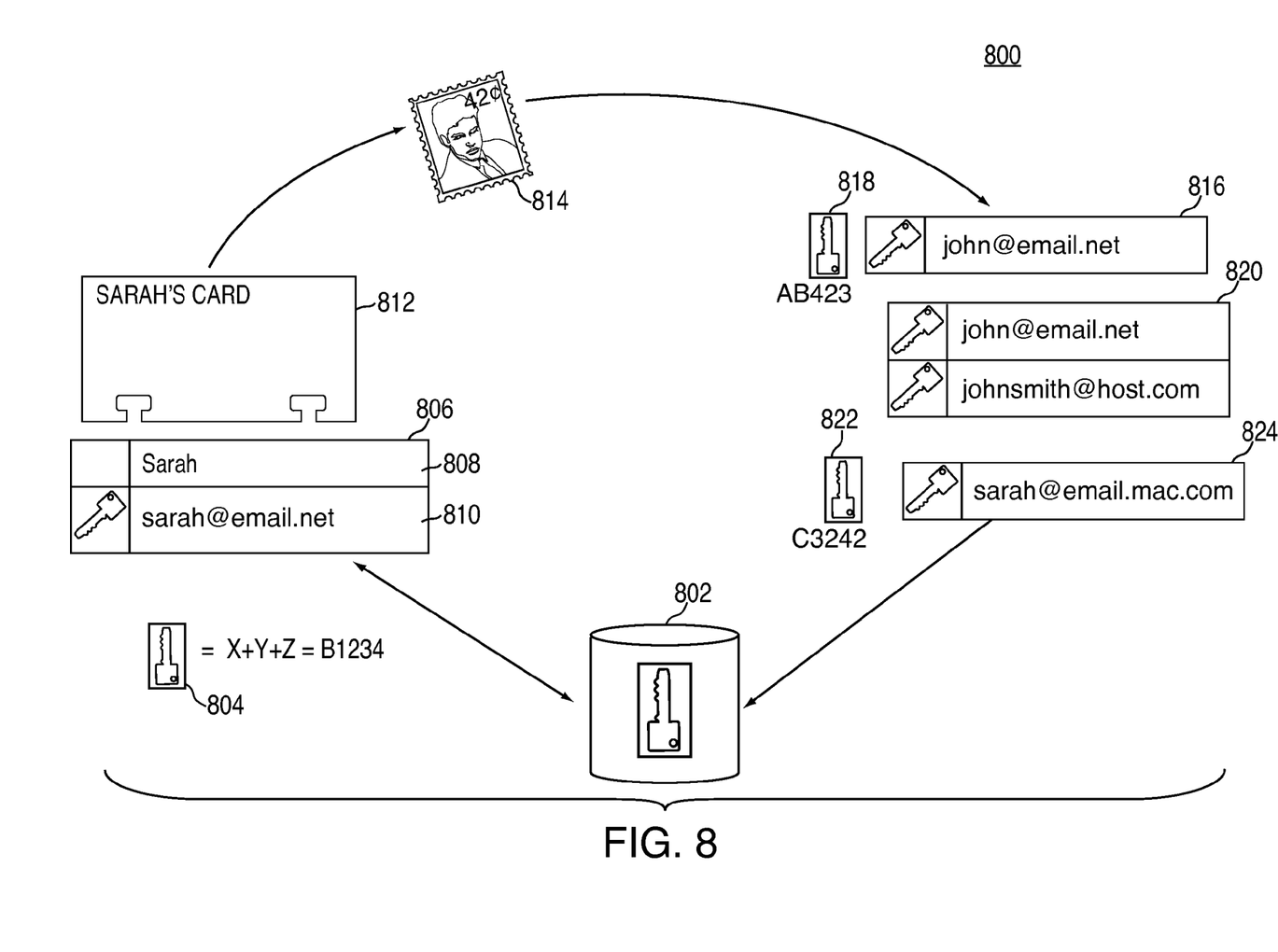
FIG. 8 is a schematic diagram of a security system at work in accordance with some embodiments of the present invention.

FIG. 8 shows an illustration of how security manager 126 can operate in accordance with embodiments of the present invention. Security manager 126, which is running on server 802 (which may be, at least in part, similar to librarian services 602 or could be running in framework 120), generates an auto-lock key 804 (in this case, the sequence "B1234") for user Sarah's email address "sarah@e-mail." As shown by ID representation block 806, user Sarah 808 currently only has one ID representation 810, which links the auto-lock key 804 to the user's email "sarah@e-mail." Now, user "sarah@e-mail" grants access to a card and/or catalog to user "John@email.net." The invitation 814 may contain information about assets, a project, etc. Security manager 126 can perform checks to see if john@email.net has any identity in the system. If no identity exists, security manager 126 creates one by generating an autolock key 818 that is linked to the john@email.net address 816.

In order to maintain security, this process should be performed outside of Sarah's control so that she cannot see the autolock key under any circumstances. Accordingly, that task should be performed by librarian services 602. Librarian services 602 can send the invitation from Sarah to john using the email address john@email.net. Attached to that email either as a web-link or as some other traditional attachment should be John's specific identity block 816 (like block 806 for Sarah) that contains his auto-lock key and linked email address.

John's system would receive this block and check to see if he had never used the system before, in which case the system would use it as his only identity. The system would also use the key to access Sarah's shared information. If, on the other hand, John had already established an identity block 824 with key 822 (like Sarah's 806) then the system (working with Librarian services 602) would instead add the new auto-lock key and linked email to the list of "identities" for John. Thus, librarian services 602 would be updated so that if someone else granted john@email.net access to something it would not generate a new key but rather would use an existing one.

Security manager 126, running on librarian 602, or a similar system component, keeps track of all of the different IDs propagated for a single user, and can easily link one to another. In this manner, the users are freed from having to keep track of everyone's ever changing IDs.

Once John tries to access the information on the card he received from Sarah by presenting his identity, he is permitted to have the appropriate access to the information. Operations regarding John, as a recipient of new key information from someone else, are controlled automatically. Whenever he receives a new key generated by someone else's request, such as Sarah, his security manager links the new key with his existing identity record(s) for all of his other keys.

These techniques can provide a number of advantages as compared to conventional systems. In accordance with embodiments of the present invention, network system 100 is capable of generating a virtually unlimited number of unique identities for a given user. One advantage of multiple identities for a single user is the ease with which groups, and therefore ACLs, can be managed because they are seen as being behind a "single" identity to users (each with their own view). Moreover, such architecture can enable the system to permit the user to change or add to his ID(s) without negatively impacting the system. For example, if user "e-mail" changed his ID to user "Hank" security manager 126 could simply change e-mail identifier 722 to "Hank" (and possibly, but not necessarily, change ID representation 726 from "e-mail" to "Hank"). All of the other IDs can remain constant. The system could alternatively, simply add the new ID to the old one so that the user could utilize both.

The above-described embodiments of the present invention are presented for purposes of illustration and not of limitation.

What is claimed is:

1. A system for providing access control to content published by a host, wherein the system comprises:
 a content storage system that stores content;
 a security manager that creates abstract identities for the host and users, and creates unique auto-lock keys when the host grants access rights to at least one user, the security manager being capable of coupling the auto-lock keys to specific content upon request of the host, wherein the host creates at least two different auto-lock keys corresponding to different content for the at least one user; and
 a framework interface that communicates secured messages from the host to the at least one user using the abstract identities when the at least one user is provided access to content published by the host.

2. The system of claim 1, further comprising:
 a user interface that receives settings from the host defining access rights to at least some content published by the host.

3. The system of claim 2, wherein the framework interface utilizes an auto-lock key to provide the at least one user with access to content published by the host in accordance with the defined access rights.

4. The system of claim 1, wherein the security manager comprises:
 librarian services that check to see if a new user has an identity on the system and, if not, create the identity.

5. The system of claim 4, wherein the librarian services act automatically and are secured from individual users, such that individual users are prevented from accessing auto-lock keys.

6. The system of claim 1, further comprising:
 storage management circuitry that automatically adds storage capacity to the storage content system in response to a storage capacity of the storage content system reaching a threshold.

7. The system of claim 1, wherein the content storage system comprises at least one portable storage device.

8. A method for providing access control to content published by a host comprising:
 storing content on a content storage system;
 creating, by a security manager abstract identities for the host and users, and creating unique auto-lock keys when the host grants access rights to at least one user, such that the security manager is capable of coupling the auto-lock keys to specific content upon request of the host, and such that at least two different auto-lock keys corresponding to different content are created for the at least one user; and
 communicating secured messages from the host to the at least one user using the abstract identities when the at least one user is provided access to content published by the host.

9. The method of claim 8, further comprising:
 receiving settings from the host defining access rights to at least some content published by the host.

10. The method of claim 9, wherein creating abstract identities comprises:
 utilizing an auto-lock key to provide the at least one user with access to content published by the host in accordance with the defined access rights.

11. The method of claim 8, wherein communicating comprises:
 checking to see if a new user has an identity on the system and, if not, creating one.

12. The method of claim 11, wherein checking occurs automatically and secured from individual users, such that individual users are prevented from accessing auto-lock keys.

13. The method of claim 8, further comprising: automatically adding storage capacity based on storage capacity reaching a threshold.

14. The method of claim 8, wherein storing comprises: storing content on at least one portable storage device.

15. The method of claim 14, wherein storing content on at least one portable storage device comprises: storing content on a portable memory device.

16. The system of claim 7, wherein the at least one portable storage device comprises a portable memory device.

17. A machine-readable non transitory storage medium storing instructions that, when executed by a processor included in a computing device, cause the computing device to carry out steps that include:
 storing content on a content storage system;
 creating abstract identities for a host and users, and creating unique auto-lock keys when the host grants access rights to at least one user;
 coupling the auto-lock keys to specific content upon request of the host, such that at least two different auto-lock keys corresponding to different content are created for the at least one user; and
 communicating secured messages from the host to the at least one user using the abstract identities when the at least one user is provided access to content published by the host.

18. The machine-readable non transitory storage medium of claim 17, further comprising:
 receiving settings from the host defining access rights to at least some content published by the host.

19. The machine-readable non transitory storage medium of claim 17, wherein creating abstract identities comprises:
 utilizing an auto-lock key to provide the at least one user with access to content published by the host in accordance with the defined access rights.

20. The machine-readable non transitory storage medium of claim 17, wherein communicating comprises:
 checking to see if a new user has an identity on the system and, if not, creating one.

* * * * *